C. UEBELMESSER.
MOTION PICTURE KINETOSCOPE.
APPLICATION FILED MAR. 11, 1915.
1,291,276.
Patented Jan. 14, 1919.
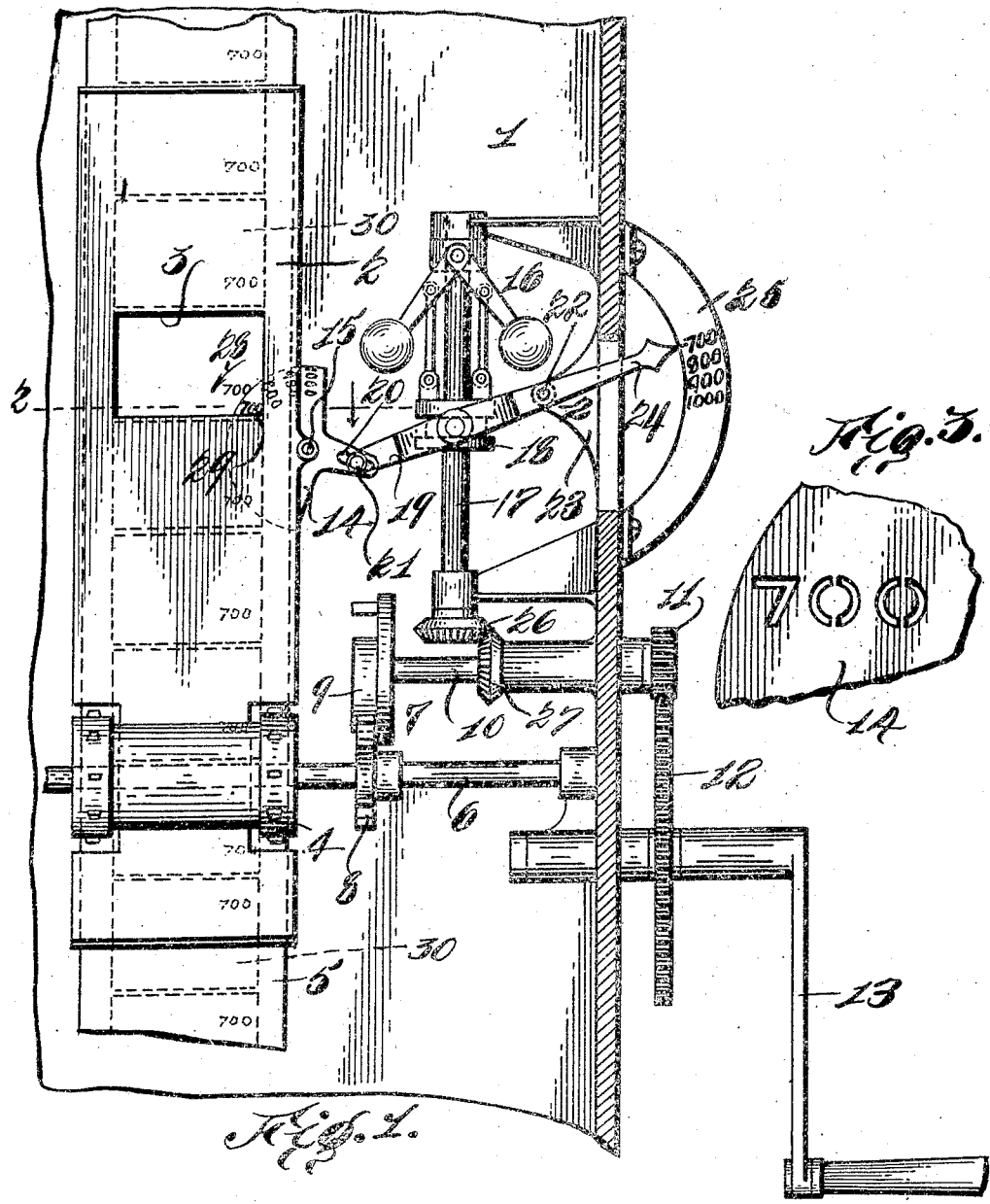
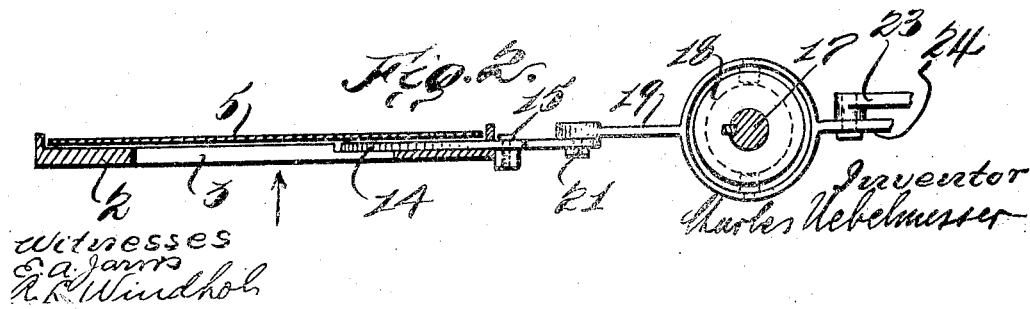

UNITED STATES PATENT OFFICE.

CHARLES UEBELMESSER, OF NEW YORK, N. Y., ASSIGNOR TO CRU PATENTS CORPORATION, A CORPORATION OF NEW YORK.

MOTION-PICTURE KINETOSCOPE.

1,291,276.      Specification of Letters Patent.      Patented Jan. 14, 1919.

Application filed March 11, 1915. Serial No. 13,817.

*To all whom it may concern:*

Be it known that I, CHARLES UEBELMESSER, a subject of the Emperor of Germany, residing at New York city, county and State of New York, have invented certain new and useful Improvements in Motion-Picture Kinetoscopes, of which the following is a full, clear, and exact description.

This invention relates to an improvement in motion picture projecting machines or kinetoscopes, the object being to provide such a device arranged to cast upon a screen, in connection with the pictures or scene, certain indications representing the speed at which the film is being operated. To get the best results a film should be operated, when producing a scene, at the same speed at which the film was operated when the picture was taken. The record of the speed at the time of taking the picture is placed upon the film by a mechanism, which forms the subject matter of a co-pending application filed by me on Mar. 11, 1915, Serial No. 13,819, at the time the picture is taken.

The function of this invention is to cast upon the screen indications which will notify the operator as to the speed at which he is operating the film, hence the speed of reproduction can be made to agree with the record of the speed at which the picture was taken.

In the drawings which form part of this application Figure 1 is a fragmentary sectional view of a kinetoscope embodying my improvement.

Fig. 2 is a sectional plan view, the section being taken on a line 2—2 in Fig. 1;

Fig. 3 is a fragmentary detail view of a portion of the stencil plate which forms part of my improvement.

In the drawing, which illustrates more or less diagrammatically the film operating mechanism of a kinetoscope, a portion of a film and the aperture plate therefor, the numeral 1 indicates a portion of the casing, while 2 indicates the aperture plate provided with the usual opening 3. The numeral 4 indicates the sprocket for advancing the film 5, the said sprocket being carried by a shaft 6 driven by a Geneva movement 7, one member 8 of which is carried by the shaft 6, the other member 9 being carried by an operating shaft 10 driven by gears 11 and 12 by an operating handle 13.

One of the features of this invention is the provision of a device to cast upon a screen a speed indication. To carry out this feature I provide a stencil plate or carrier 14, which in this instance is pivotally secured to the aperture plate as at 15. The plate 14 is positioned so as to cause the numerals thereon to pass between the rear surface of the film 5 and front surface of the plate 2 and across one of the lower corners of the aperture 3 as shown in Fig. 1. The numerals indicating the different speeds are in the form of openings in the plate 14, as shown in Fig. 3.

To operate the plate 14 I preferably employ a governor 16 carried by a shaft 17 and operating a slidable collar 18 which in turn operates a lever 19 pivotally connected to the arm 20 on the plate 14 as at 21.

The lever 19 is pivotally connected at 22 to a bracket 23 in the casing 1 and carries an extension or pointer 24. In connection with the pointer 24 I employ an index plate 25 provided with numerals to agree with the numerals on the plate 14.

To operate the shaft 17 I provide the same with a gear 26 which meshes with a gear 27 on the driving shaft 6.

When the handle 13 is rotated the sprocket 4 will advance the film 5 and the governor 16 will also rapidly rotate. As the governor rotates the arms thereof will move outwardly, thereby drawing the collar 18 upwardly and rotating the plate 14 in the direction of the arrow 28, thereby causing the numerals thereon to cross the corner 29 of the opening 3. The speed at which the film is being driven determines what numeral will be positioned in the corner 29. For instance, if the film is being driven at a speed of seven hundred feet per minute the governor 16 will swing the plate 14 to cause the numeral 700 to be positioned in the corner 29 as shown in Fig. 1. Should the film be operated at the rate of 800 feet per minute the numeral 800 will be positioned in the corner 29.

Whatever numeral comes into the corner 29 of the opening 3 will be cast upon the screen in the corner of the picture corresponding to the corner 29 of the opening 3 by the light that casts the picture upon the screen.

In Fig. 1, the spaces occupied by the pictures on the film are illustrated by 30 and in one corner of said spaces there will be applied a record of the speed at which the film was operated while the picture was being taken.

In this instance the speed of the film was 700 feet per minute, hence when the picture is reproduced the operator will rotate the handle rapidly enough to cause the numeral 700 to be positioned in the corner 29. The operator will know when the said numeral comes to the said position by the picture cast upon the screen and also by the pointer 24 and index plate 25. By this means the speed of the film can be governed and the handle 13 manipulated to cause the proper speed to be maintained.

As soon as the first picture is thrown upon the screen the operator will know at what speed to operate the kinetoscope.

The function of the pointer 24 and index 25 is to enable the operator to tell at what speed he is operating the film and is therefore an auxiliary speed indicator.

What I claim is:

1. In a moving picture machine, an aperture plate having an opening, means to advance a film across said opening, a carrier arranged to aline with a portion of said opening provided with speed indications in the form of openings, and means controlled by the speed of the moving picture machine to operate said carrier.

2. In a moving picture machine having an aperture, means to advance a film across said aperture, a mechanical exhibit indicating the speed of the moving picture machine in the aforesaid aperture, and means to indicate exterior to said aperture the speed exhibited by said mechanical exhibit in the aperture, said mechanical exhibit and said means being controlled by the speed of said machine.

3. In a moving picture machine having an aperture, means to advance a film, and means whereby another exhibit may be brought into the same aperture, the action of said secondary exhibit being controlled by the speed of the moving picture machine.

4. In a moving picture machine, a film advancing mechanism, an adjustable stencil plate provided with openings representing speed indications, an aperture plate provided with an opening, and means operable in conjunction with the film advancing mechanism to automatically adjust the speed indications carried by the stencil plate relative to a portion of the opening in the aperture plate.

5. In a moving picture machine having an aperture, means to advance a film, a speed indicator provided to advance an exhibit-indicating the speed of the moving picture machine into the aperture, in combination with means to indicate the same speed exterior to said aperture and moving picture machine.

Signed at New York city, N. Y., this 4th day of March, one thousand nine hundred and fifteen.

CHARLES UEBELMESSER.

Witnesses:
R. L. WINDHOLZ,
FRED F. WEISS.